United States Patent
Hulbert et al.

(10) Patent No.: US 9,483,399 B2
(45) Date of Patent: Nov. 1, 2016

(54) SUB-OS VIRTUAL MEMORY MANAGEMENT LAYER

(75) Inventors: Jared E Hulbert, Shingle Springs, CA (US); Hongyu Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 12/650,952

(22) Filed: Dec. 31, 2009

(65) Prior Publication Data

US 2011/0161550 A1 Jun. 30, 2011

(51) Int. Cl.
G06F 12/08 (2016.01)

(52) U.S. Cl.
CPC ......... *G06F 12/08* (2013.01); *G06F 2212/401* (2013.01)

(58) Field of Classification Search
CPC .......................... G06F 12/08; G06F 2212/401
See application file for complete search history.

(56) References Cited

U.S. PATENT DOCUMENTS

| | | | |
|---|---|---|---|
| 2007/0016693 A1* | 1/2007 | Goodrich | 709/247 |
| 2007/0192549 A1* | 8/2007 | Oh | 711/154 |
| 2010/0115191 A1* | 5/2010 | Hampel et al. | 711/103 |

OTHER PUBLICATIONS

Kjelso, Gooch, and Jones, Performance evaluation of computer architectures with main memory data compression, Journal of Systems Architecture, vol. 45, pp. 571-590, 1999.*
Saastamoinen, Saastamoinen, and Nurmi, "Code Compression in DSP Processor Systems", International Journal of Embedded Systems, vol. 3, No. 4, 2008.*

* cited by examiner

*Primary Examiner* — Michael Alsip
(74) *Attorney, Agent, or Firm* — Dorsey & Whitney LLP

(57) ABSTRACT

A binary memory image in system is modified. The system may or may not already have virtual memory management enabled. Virtual memory management is enabled and/or modified by inserting a sub-OS virtual memory management layer in the binary memory image. Part of the binary memory image may be compressed to make room for the sub-OS virtual memory management layer.

10 Claims, 5 Drawing Sheets

US 9,483,399 B2

SUB-OS VIRTUAL MEMORY MANAGEMENT LAYER

FIELD

The present invention relates generally to computer systems, and more specifically to virtual memory in computer systems.

BACKGROUND

Many relatively simple electronic systems do not use virtual memory. For example, an inexpensive mobile phone may have a real-time operating system (RTOS) that maps all available physical memory directly into the virtual memory space of a processor. This is a simple solution that decreases the complexity of the system as compared to systems that incorporate virtual memory.

Since non-virtual memory systems have a "flat" memory map and do not swap pages of memory between different memory types, they typically include enough random access memory (RAM) to support the largest expected RAM requirement while the system is operating, whereas virtual memory systems can include less RAM since some memory contents may be paged out to nonvolatile memory. Tradeoffs are made between the cost of extra RAM and the cost of adding virtual memory capability to the system.

BRIEF DESCRIPTION OF THE DRAWINGS

Embodiments of the invention are illustrated by way of example and not limitation in the figures of the accompanying drawings, in which like reference numerals indicate similar elements and in which.

DESCRIPTION OF EMBODIMENTS

Figure 1:
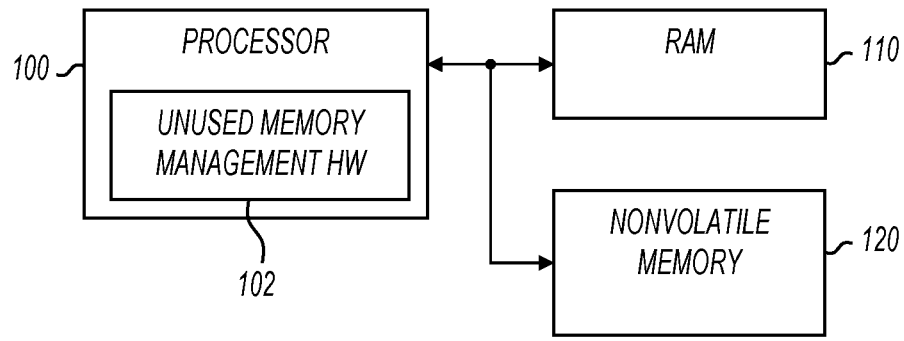
FIG. 1 shows an electronic system with unused memory management hardware.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
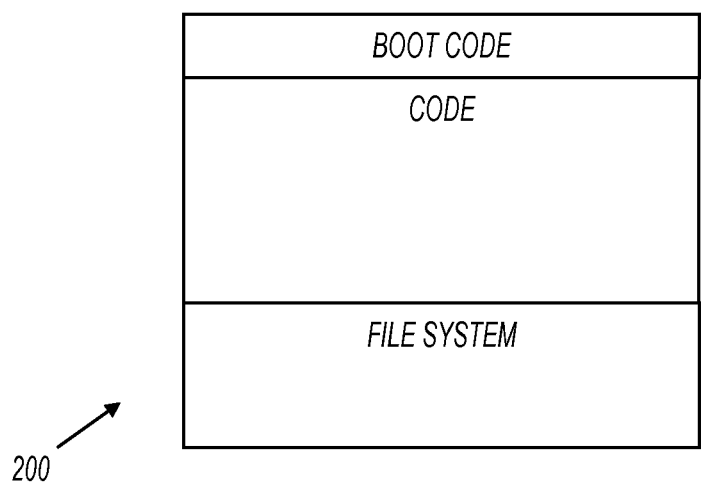
FIG. 2 shows a nonvolatile memory image.

Many embedded processors include memory management hardware that does not necessarily get used. An example of such a system is shown in FIG. 1. Processor 100 includes unused memory management hardware 102. Random access memory (RAM) 110 and nonvolatile memory 120 are memory mapped directly in the memory space of processor 100. An example nonvolatile memory image is shown in FIG. 2. The memory image 200 includes executable code including boot code, and a file system. In operation, processor 100 accesses the file system in the nonvolatile memory 120, and uses the RAM 110 for temporary storage. Code is executed either from RAM 110 after being copied there from nonvolatile memory 120 or directly from nonvolatile memory 120.

Figure 3:
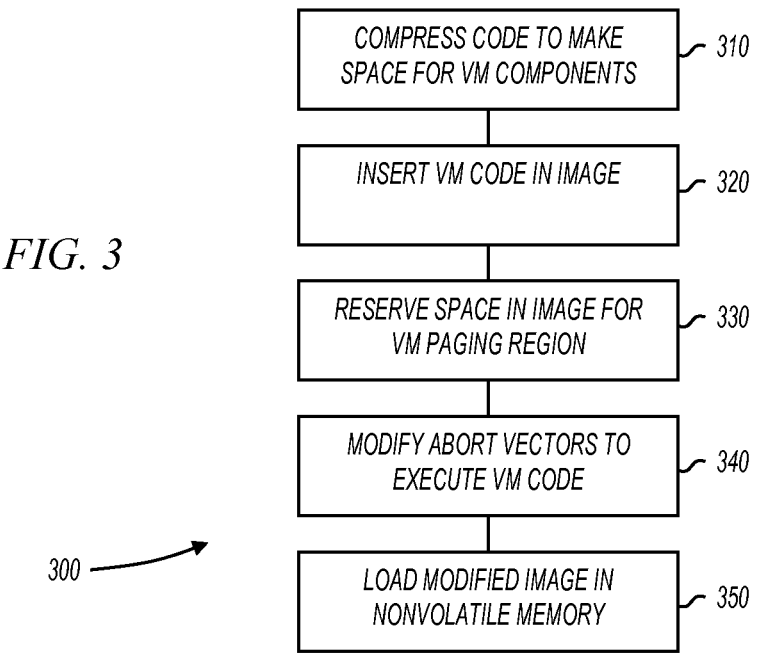
FIG. 3 shows a flow diagram in accordance with various embodiments of the present invention.
Figure 4:
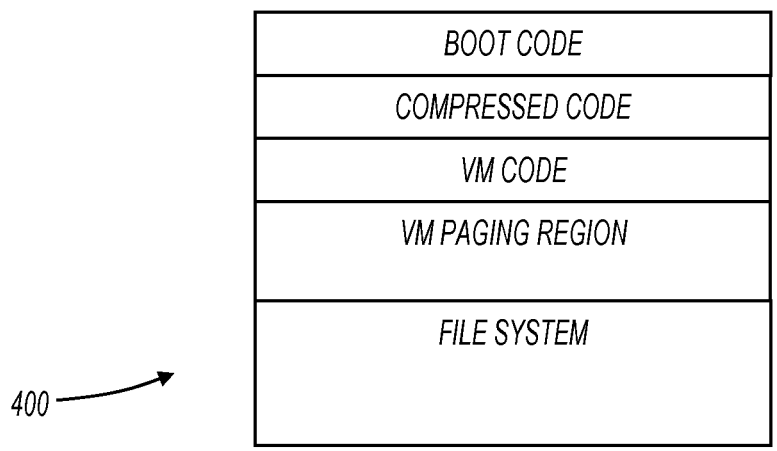
FIG. 4 shows a nonvolatile memory image in accordance with various embodiments of the invention.

FIG. 3 shows a flow diagram of a method in accordance with various embodiments of the present invention, and FIG. 4 shows a nonvolatile memory image that results when the method of FIG. 3 operates on the nonvolatile memory image shown in FIG. 2. Method 300 is used to modify a binary image from an electronic system. For example, the binary image may come from nonvolatile memory in a mobile phone, a set-top box, a network router, a global positioning system (GPS) receiver, or any other electronic system.

In some embodiments, method 300, or portions thereof, is performed by a processor executing software that modifies one or more binary files. Method 300 is not limited by the particular type of apparatus performing the method. The various actions in method 300 may be performed in the order presented, or may be performed in a different order. Further, in some embodiments, some actions listed in FIG. 3 are omitted from method 300.

Method 300 begins at block 310 in which executable code is compressed to make space in the memory image for virtual memory management components. In some embodiments, only non-boot code is compressed. As shown in FIG. 4, non-compressed boot code and compressed non-boot code is included in the resulting memory image 400. The compressed code in FIG. 4 includes the same information as the code in FIG. 2, but occupies much less space. In some embodiments, block 310 is omitted. For example, the original binary memory image may not completely fill the nonvolatile memory in the electronic system. In these embodiments, sufficient room in the memory device may already exist, and compression may not be performed.

In some embodiments, other parts of the original memory image are compressed to free space in the memory map. Executable code is provided as an example candidate for compression, however any contents within the original memory image may be compressed without departing from the scope of the present invention.

At 320, virtual memory management components are inserted in the binary image. The virtual memory management components may include initialization code for the memory management unit. For example, registers within the memory management unit may be modified to enable virtual memory management. The virtual memory management code may also include fault handlers. For example, the virtual memory management components may include code that runs when a memory fault is encountered. Also for example, in some embodiments, memory management may have already been enabled. In these embodiments, the virtual memory management components may modify the operation of the memory management unit that is already enabled.

At 330, space in the binary image is reserved for a paging region. The space that is reserved may correspond to space freed by the compression operation, or space that existed in the original binary image before the compression operation. In some embodiments, existing free space is utilized and there is no compression operation. The paging region is used to store memory pages that are paged out of RAM. The paging region in the resulting memory image is shown in FIG. 4. The size of the paging region is not a limitation of the present invention. For example, the size of the paging region may be limited by the amount of code compression, the amount of unused space within the nonvolatile memory device, or other factors.

At 340, abort vectors are modified in the memory image. Abort vectors specify the location of fault handlers in the memory image. Prior to modifying the memory image, the abort vectors may point to null routines, or may point to the boot code, because memory faults are not expected since the memory management unit is not enabled. Different processors have different numbers of abort vectors. Further, different processors may refer to abort vectors using different nomenclature, such as "interrupt vectors". Any number of abort vectors and any naming convention therefor may be used without departing from the scope of the present invention.

At 350, the modified binary image is loaded in nonvolatile memory in the electronic system. The modified binary image now includes code that when executed enables and/or modifies virtual memory management, and handles memory faults and page swaps between RAM and nonvolatile memory. The code in the original binary (e.g., the operating system, applications, etc.) operates as before without any knowledge that virtual memory support in the system has changed.

Method 300 illustrates adding a virtual memory management layer beneath, and without the knowledge of, the operating system. This is referred to herein as a sub-OS virtual memory management layer. The sub-OS virtual memory management layer provides advantages of virtual memory without increasing the complexity of application development beyond the original environment.

Method 300 does not require access to source code of the original OS or the application code that compiled into the original binary image. Knowledge of the underlying hardware architecture (e.g., abort vector locations) is sufficient.

Figure 5:
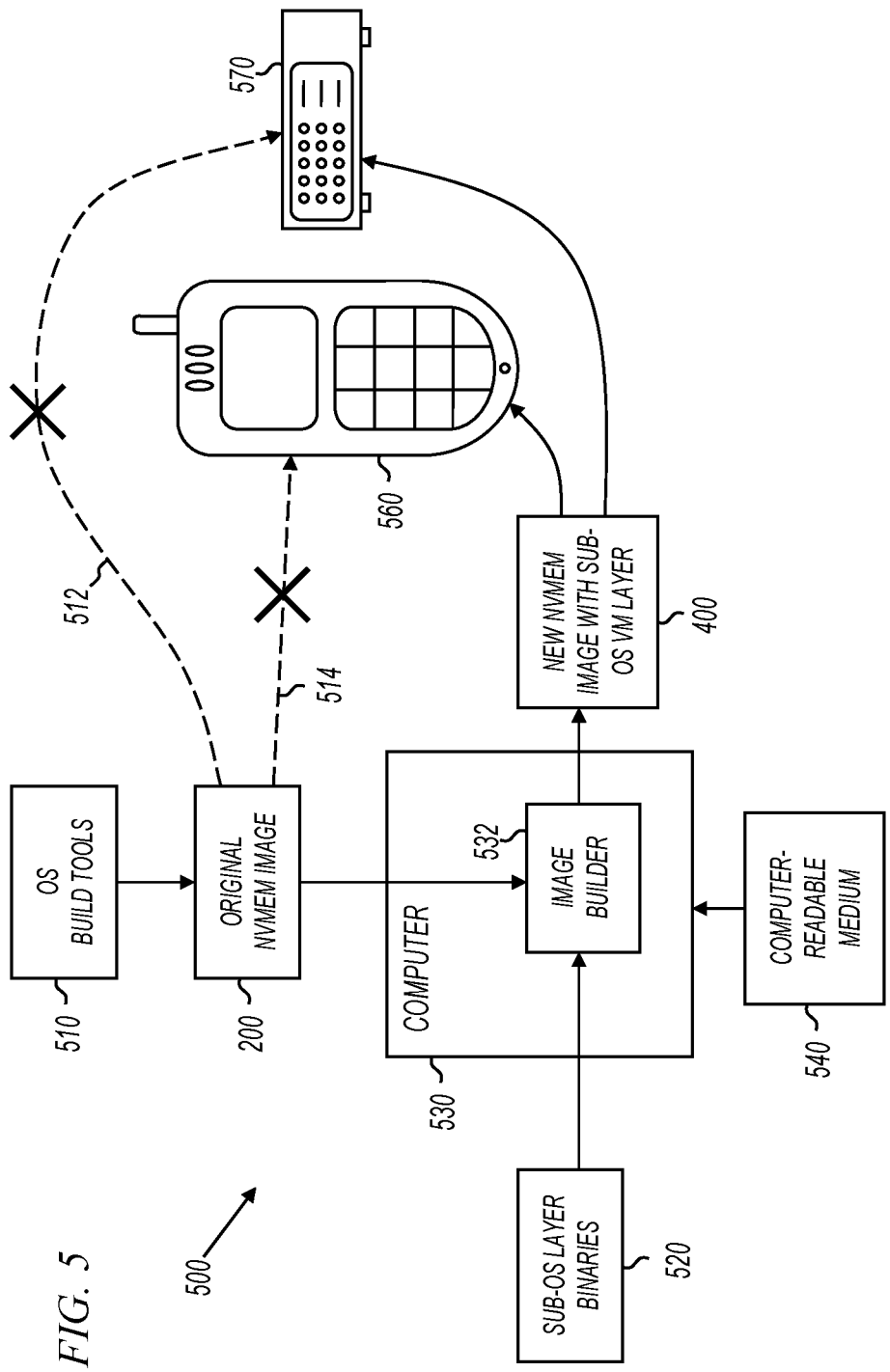
FIG. 5 shows a process flow for adding a sub-OS virtual memory management layer to an electronic system in accordance with various embodiments of the present invention.

FIG. 5 shows a process flow for adding a sub-OS virtual memory management layer to an electronic system in accordance with various embodiments of the present invention. Process flow 500 includes OS build tools 510 that produce original nonvolatile memory image 200. As described above, nonvolatile memory image 200 includes code that does not make use of memory management units within the intended electronic system.

In some embodiments, OS build tools 510 may be operated by a manufacturer of an electronic system that includes unused memory management hardware. For example, the manufacturer of mobile phone 560 or the manufacturer of device 570 may use OS build tools 510 to create nonvolatile memory image 200. If nonvolatile memory image 200 is loaded in mobile phone 560 or device 570, then these systems do not include virtual memory management even though the underlying supporting hardware exists. In other embodiments, OS build tools 510 may be operated by a manufacturer of an electronic system that has memory management hardware that is used. Regardless of whether the memory management hardware is used or not, the various embodiments of the present invention may insert a sub-OS virtual memory management layer.

As shown at 512 and 514, process flow 500 does not load the original nonvolatile memory image 200 in any electronic system. Rather, the process flow continues by modifying the nonvolatile memory image 200 as described above with reference to FIG. 3 to add a sub-OS virtual memory management layer.

Computer 530 includes an image builder component 532. Image builder component 532 receives the original nonvolatile memory image 200 and sub-OS virtual memory management layer binaries 520 and produces a new nonvolatile memory image with the sub-OS virtual memory management layer 400. Image builder component 532 operates as described above in method 300 by finding or freeing space in the original nonvolatile memory image and inserting virtual memory management components including vector modifications, virtual memory management initialization code and fault handlers.

Image builder component 532 may be hardware, software, or any combination. For example, image builder component 532 may be formed when computer 530 executes instructions stored on machine-readable medium 540. Machine-readable medium 540 may be any medium capable of storing instructions. Examples include, but are not limited to: floppy disks, hard disks, CD-ROMs, and solid state memory devices.

New nonvolatile memory image 400 includes a sub-OS virtual memory management layer. The operating system included by the OS build tools 510 is not aware of the sub-OS virtual memory management layer. The new nonvolatile memory image 400 is loaded into an electronic system. For example, and not by way of limitation, memory image 400 may be loaded in nonvolatile memory in mobile phone 560 or device 570. Memory image 400 may be loaded in any type of electronic system without departing from the scope of the present invention.

In some embodiments, the various actions represented by process flow 500 are performed by different actors. For example, a manufacturer of mobile phone 560 may build the original nonvolatile memory image 200 with the intention of loading the image in the mobile phone. The manufacturer does not intend to utilize the memory management hardware in mobile phone 560, and so opts for the simplicity of the RTOS development environment without enabling virtual memory.

A second actor, with or without the manufacturer's knowledge, may operate image builder 532 to add the sub-OS virtual memory management layer. As shown in FIG. 5, in some embodiments, the second actor may have access to the original nonvolatile memory image prior to being loaded in the electronic system. In other embodiments, the second actor may read the original nonvolatile memory image from the electronic device. For example, the original nonvolatile memory image 200 may be read from mobile phone 560 or device 570 prior to operations being performed by image builder 532.

FIG. 5 shows two examples of electronic systems: a mobile phone and a generic device. Any type of electronic system may be incorporated in process flow 500 without departing from the scope of the present invention. For example, device 570 may be a set-top box, a handheld radio, a network router, a wireless access point, a GPS receiver, or any other system with unused memory management hardware that can be utilized by the sub-OS virtual memory management layer.

Figure 6:
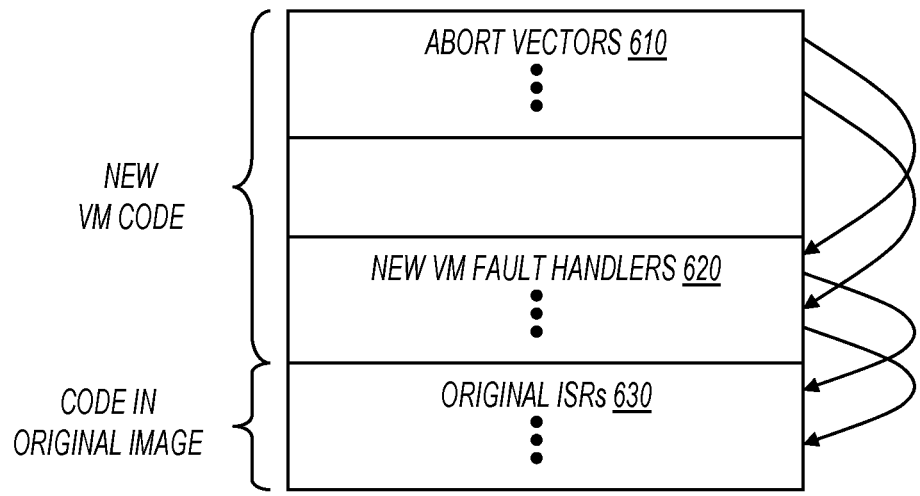
FIG. 6 shows modified abort vectors pointing to sub-OS virtual memory fault handlers.

FIG. 6 shows modified abort vectors pointing to sub-OS virtual memory fault handlers. The modified abort vectors 610 and the new virtual memory fault handlers 620 of FIG. 6 are part of the sub-OS virtual memory management binaries 520 (FIG. 5) that have been added to the nonvolatile memory image. The abort vectors in the original nonvolatile memory image have been modified to point to the new virtual memory fault handlers. The new virtual memory fault handlers are also shown pointing to code in the original memory image, but this is not a limitation of the present invention. For example, in some embodiments, the virtual memory fault handlers may exit without transferring execution to any code in the original memory image.

Figure 7:
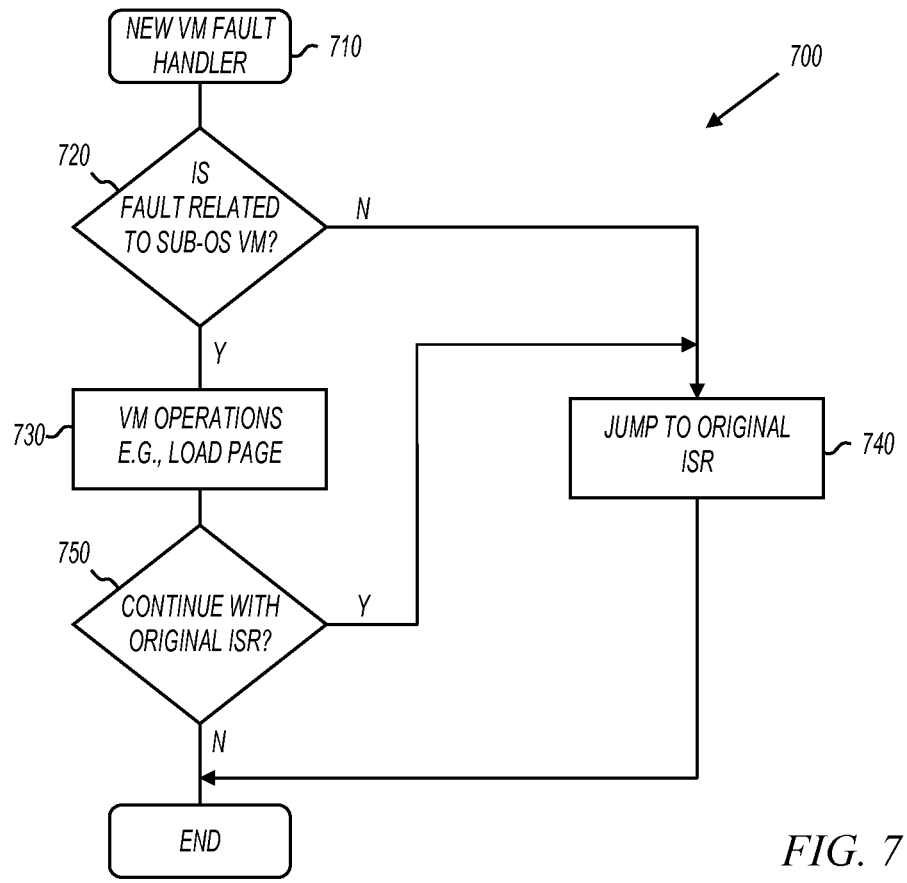
FIG. 7 shows a flow diagram of a method representing operation of a sub-OS virtual memory fault handler in accordance with various embodiments of the present invention.

FIG. 7 shows a flow diagram of a method representing operation of a sub-OS virtual memory fault handler in accordance with various embodiments of the present invention. In some embodiments, method 700, or portions thereof, is performed by an electronic system that has a sub-OS virtual memory management layer present. The sub-OS virtual memory management layer may have been added to the electronic system using the embodiments described herein. The various actions in method 700 may be performed in the order presented, or may be performed in a different order. Further, in some embodiments, some actions listed in FIG. 7 are omitted from method 700.

Method 700 begins at 710 when a memory fault occurs, and the fault handler is invoked because of the modified abort vectors in the new nonvolatile memory image. At 720, a test is performed to determine whether the fault is related to the sub-OS virtual memory management layer. In some embodiments, this may be an address range check. In other embodiments, there may be flags or registers in the processor that can be checked to determine whether the fault is related to the sub-OS virtual memory management layer.

If the fault is not related to the sub-OS virtual memory management layer, then processing either ends or is transferred to the original interrupt service routine 740 using the original abort vector values. In some embodiments, the original interrupt service routine 740 may be a form of virtual memory management. In other embodiments, interrupt service routine 740 may not have any function at all. If the fault is related to the sub-OS virtual memory management layer, then processing continues at 730 where virtual memory operations are performed. Any suitable operation may be performed at 730. For example, a load operation may be performed in which a memory page is loaded from nonvolatile memory to volatile memory. Also for example, contents cached in RAM that are destined for a file system in nonvolatile memory may be written down to the nonvolatile memory. The various embodiments of the invention are not limited by the type of virtual memory operations performed at 730.

At 750, method 700 determines whether to continue by transferring control to the original interrupt service routine 740 or by ending. In some embodiments, this is a hard-coded decision that is a function of the purpose of the original interrupt service routine. In embodiments where the original interrupt service routine does nothing or reboots the system, then the decision at 750 may be hard-coded to always end. In other embodiments, the decision is made by some other criteria.

Figure 8:
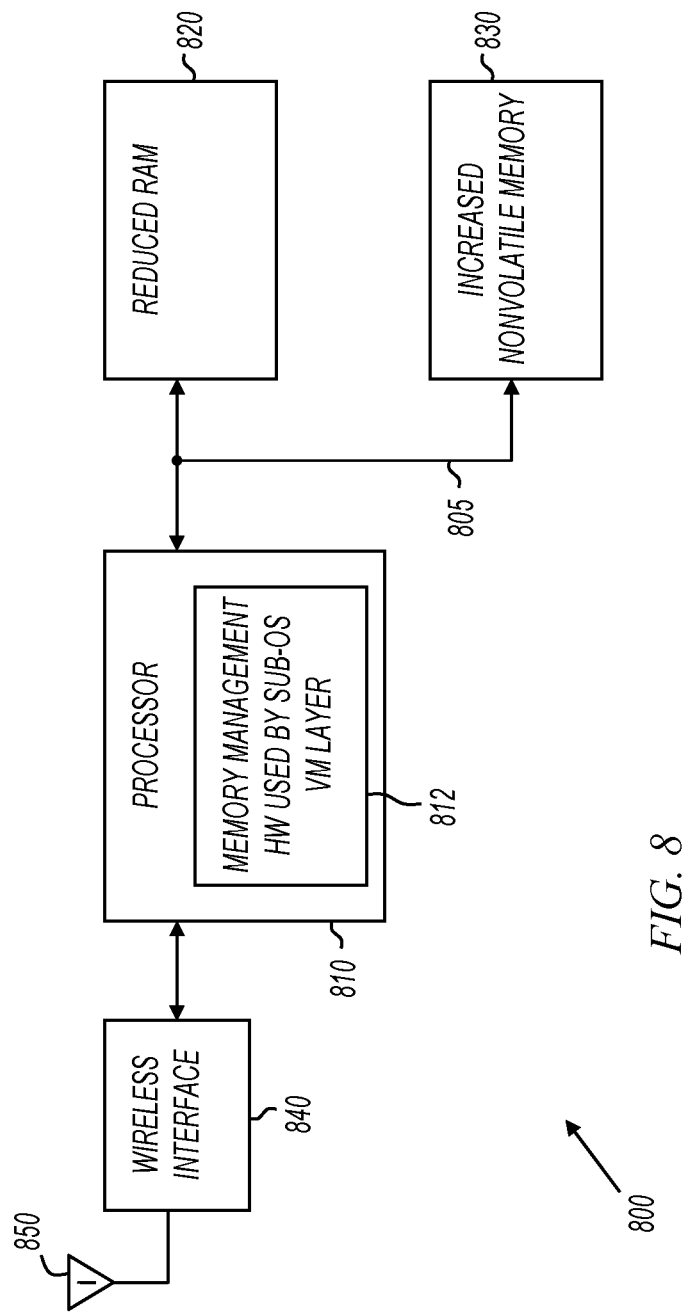
FIG. 8 shows an electronic system in accordance with various embodiments of the present invention.

FIG. 8 shows an electronic system in accordance with various embodiments of the present invention. System 800 may be any type of system that includes a memory management unit. For example, system 800 may be a mobile phone with volatile and nonvolatile memory. Also for example, system 800 may be a global positioning system (GPS) receiver, a set-top box, a network router, a wireless access point, or a portable media player with volatile and nonvolatile memory. System 800 may be any type of device without departing from the scope of the present invention.

In some embodiments, system 800 has a wireless interface 840. Wireless interface 840 is coupled to antenna 850 to allow system 800 to communicate with other over-the-air communication devices. As such, system 800 may operate as a cellular device or a device that operates in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. It should be understood that the scope of the present invention is not limited by the types of, the number of, or the frequency of the communication protocols that may be used by system 800. Embodiments are not, however, limited to wireless communication embodiments. Other non-wireless applications can use the various embodiments of the invention.

System 800 includes processor 810 coupled to interface 805. Interface 805 provides communication between processor 810 and the various other devices coupled to interface 805. For example, processor 810 may communicate with RAM 820 and nonvolatile memory 830. Interface 805 can include serial and/or parallel buses to share information along with control signal lines to be used to provide handshaking between processor 810 and the various other devices coupled to interface 805.

Processor 810 may be a standalone processor available off-the-shelf. In other embodiments, processor 810 may be a synthesizable core such as those available from ARM Ltd. For example, the processor may be an ARM926EJ-S™ available from ARM Ltd. In some embodiments, the entire (or a majority) of the system may be implemented in a chip set. For example, in some embodiments, the system may include one of Agere's TrueNTRY™ solutions, such as the Agere X125 chip set.

Processor 810 includes a memory management unit 812 that is enabled and operated by a sub-OS virtual memory management layer. The sub-OS virtual memory management layer is incorporated in the nonvolatile memory image within nonvolatile memory 830 using any of the embodiments described herein.

Random Access Memory (RAM) 820 is shown as "reduced" because the amount of RAM in the system may be less than that required before adding the sub-OS virtual memory management layer. Nonvolatile memory 830 is shown as increased because, in some embodiments, the amount of nonvolatile memory 830 is increased over the amount present in the system prior to adding the sub-OS virtual memory management layer. Because RAM is generally more expensive than nonvolatile memory, the savings resulting from reduced RAM more than offsets the cost of adding nonvolatile memory to support virtual memory. Accordingly, various embodiments of the present invention allow a system to be upgraded to a virtual memory system, thereby saving the cost of additional RAM, while still allowing the simplicity of design of an RTOS system without virtual memory enabled.

Although system 800 is described as having an increased amount of nonvolatile memory and a decreased amount of RAM, this is not a limitation of the present invention. For example, system 800 may be the exact same hardware system that was intended to originally operate with a nonvolatile memory image that did not support virtual memory. In these embodiments, a new nonvolatile memory image that includes a sub-OS virtual memory management layer is loaded into the same system.

Nonvolatile memory 830 may be any type of nonvolatile memory. For example, nonvolatile memory 830 may be phase change memory (PCM), NOR FLASH memory, NAND single level cell (SLC) memory, or NAND multi-level cell (MLC) memory. These memory types are listed as examples, and this list is not meant to be exclusive. For example, some embodiments may include Ovonic Unified Memory (OUM), Chalcogenide Random Access Memory (C-RAM), Magnetic Random Access Memory (MRAM), Ferroelectric Random Access Memory (FRAM), or others.

In some embodiments, processor 810 may include more than one core, and each core may include memory. For example, a first core may include volatile or nonvolatile memory such as PCM, FLASH, or RAM. Each core may include any combination of different types of memory without departing from the scope of the present invention. Processor 810 may execute instructions from any suitable memory within system 800. For example, any of the memory devices within system 800 may be considered a computer-readable medium that has instructions stored that when accessed cause processor 810 to perform embodiments of the invention.

Processor 810 also includes memory management unit (MMU) 812. In some embodiments, MMU 812 is a separate device. Memory management unit 812 is a hardware device or circuit that is responsible for handling accesses to memory requested by processor 810. As described above, MMU 812 is enabled and operated by the sub-OS virtual memory management layer that is added to the system.

Unless specifically stated otherwise, as apparent from the preceding discussions, it is appreciated that throughout the specification discussions utilizing terms such as "monitoring," "storing," "detecting," "using," "identifying," "marking," "receiving," "loading," "reconfiguring," "formatting," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

Various general purpose systems may be used with programs in accordance with the teachings herein, or it may prove convenient to construct a more specialized apparatus to perform the desired method. The desired structure for a variety of these systems appears in the description above. In addition, embodiments of the invention are not described with reference to any particular programming language. A variety of programming languages may be used to implement the teachings of the invention as described herein. In addition, it should be understood that operations, capabilities, and features described herein may be implemented with any combination of hardware (discrete or integrated circuits) and software.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
   compressing at least a portion of a binary image to create free space in the binary image, wherein the binary image comprises a real-time operating system that is not configured to utilize virtual memory management;
   inserting virtual memory management components into the free space in the binary image, wherein the virtual memory management components are configured to modify registers within a memory management unit of a processor executing the real-time operating system to enable virtual memory management, generate one or more virtual memory fault handlers in the binary image, wherein the virtual memory fault handlers are executed responsive to detecting a page fault, and modify one or more abort vectors of the binary image to point to a first virtual memory fault handler; and
   storing the modified binary image in the nonvolatile memory,
   wherein the modified binary image is configured to utilize the memory management unit without accessing the real-time operating system.

2. The method of claim 1 wherein compressing comprises compressing executable code.

3. The method of claim 1 further comprising reserving at least a portion of the free space for virtual memory pages.

4. A method comprising:
   generating a binary image, wherein the binary image comprises a real-time operating system that is not configured to utilize virtual memory management;
   compressing at least a portion of the binary image to create space in the binary image for memory management components in a nonvolatile memory, wherein the memory management components are configured to modify registers within a memory management unit of a processor executing the real-time operating system to enable virtual memory management, generate one or more virtual memory fault handlers in the binary image, wherein the virtual memory fault handlers are executed responsive to detecting a page fault, and modify one or more abort vectors of the binary image to point to a first virtual memory fault handler;
   inserting the memory management components in the space in the binary image; and storing the binary image in nonvolatile memory in an electronic device
wherein the memory management components do not access to the portion of the binary image.

5. The method of claim 4, wherein the electronic device comprises a mobile phone.

6. The method of claim 4, wherein the electronic device comprises a set-top box.

7. The method of claim 4, wherein the electronic device comprises a network router.

8. A non-transitory computer-readable medium having instructions stored thereon that when accessed result in a device performing:
reserving space in a binary image from a non-virtual electronic system responsive, at least in part, to compressing at least a portion of the binary image, wherein the binary image comprises a real-time operating system that is not configured to utilize virtual memory management;
inserting virtual memory management components into the reserved space in the binary image, wherein the virtual memory management components are configured to modify registers within a memory management unit of a processor executing the real-time operating system to enable virtual memory management, generate one or more virtual memory fault handlers in the binary image, wherein the virtual memory fault handlers are configured to handle memory faults and page swaps between random access memory and a nonvolatile memory in response to a page fault, and modify one or more abort vectors of the binary image to point to a first virtual memory fault handler; and
loading the binary image with the virtual memory management components in the electronic system
wherein the virtual memory management components do not access the portion of the binary image.

9. The non-transitory computer-readable medium of claim 8 wherein inserting virtual memory management components into the reserved space in the binary image further comprises modifying abort vectors to point to the memory fault handlers.

10. The non-transitory computer-readable medium of claim 8 wherein compressing at least a portion of the binary image comprises compressing non-boot code.

* * * * *